(12) United States Patent
Beutel et al.

(10) Patent No.: US 7,781,122 B2
(45) Date of Patent: Aug. 24, 2010

(54) BIPOLAR PLATE WITH CROSS-LINKED CHANNELS

(75) Inventors: Matthew J Beutel, Webster, NY (US); Lee C Whitehead, Middleport, NY (US); Jeffrey A Rock, Fairport, NY (US); Michael D Cartwright, Naples, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1133 days.

(21) Appl. No.: 10/755,128

(22) Filed: Jan. 9, 2004

(65) Prior Publication Data

US 2005/0153184 A1 Jul. 14, 2005

(51) Int. Cl.
*H01M 2/20* (2006.01)
*H01M 2/22* (2006.01)

(52) U.S. Cl. .................. 429/518; 429/457; 429/483

(58) Field of Classification Search ................ None
See application file for complete search history.

(56) References Cited

U.S. PATENT DOCUMENTS

| | | | |
|---|---|---|---|
| 5,482,680 A * | 1/1996 | Wilkinson et al. | 422/177 |
| 6,261,710 B1 | 7/2001 | Marianowski | 429/34 |
| 6,503,653 B2 | 1/2003 | Rock | |
| 2001/0041281 A1 * | 11/2001 | Wilkinson et al. | 429/34 |
| 2003/0224239 A1 | 12/2003 | Carlstrom | 429/38 |
| 2004/0081873 A1 * | 4/2004 | Iwai et al. | 429/26 |

FOREIGN PATENT DOCUMENTS

JP 10308227 A * 11/1998
WO WO 03/050905 6/2003

* cited by examiner

*Primary Examiner*—K. Walker
(74) *Attorney, Agent, or Firm*—Harness, Dickey & Pierce, P.L.C.

(57) ABSTRACT

A bipolar plate for use in a fuel cell stack includes a first plate having a first coolant face with a first set of coolant channels formed therein. A second plate has a second coolant face with a second set of coolant channels formed therein. The first and second coolant faces are adjacent to one another to intermittently cross-link the first and second sets of coolant channels over a region of the first and second coolant faces.

21 Claims, 7 Drawing Sheets

Figure 7

BIPOLAR PLATE WITH CROSS-LINKED CHANNELS

FIELD OF THE INVENTION

The present invention relates to bipolar plates for fuel cell stacks, and more particularly to a bipolar plate having cross-linked channels.

BACKGROUND OF THE INVENTION

Fuel cell systems are increasingly being used as a power source in a wide variety of applications. Fuel cell propulsion systems have also been proposed for use in vehicles as a replacement for internal combustion engines. The fuel cells generate electricity that is used to charge batteries and/or to power an electric motor. A solid-polymer-electrolyte fuel cell includes a polymer electrolyte membrane (PEM) that is sandwiched between an anode and a cathode. To produce electricity through an electrochemical reaction, a fuel, commonly hydrogen ($H_2$), but also either methane ($CH_4$) or methanol ($CH_3OH$), is supplied to the anode and an oxidant, such as oxygen ($O_2$) is supplied to the cathode. The source of the oxygen is commonly air.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane. The electrons flow through an electrical load (such as the batteries or the electric motor) that is connected across the membrane. In a second half-cell reaction, oxygen ($O_2$) at the cathode reacts with protons ($H^+$), and electrons ($e^-$) are taken up to form water ($H_2O$).

Bipolar plates are implemented between fuel cells in the fuel cell stack to facilitate the flow of the gaseous reactants for reaction in the fuel cells. The bipolar plates also facilitate coolant flow through the fuel cell stack to regulate a temperature of the fuel cell stack. Traditional bipolar plates include discrete or inter-digitated channels that define the reactant and coolant flow fields. Such channel configurations can induce coolant maldistribution, which results in a non-uniform temperature profile (i.e., temperature variations) across the fuel cell stack. Additionally, bipolar plates are subject to compressive loads and vibration which results in stress. Accordingly, there is a need to provide improved plate design with enhanced performance over the conventional art.

SUMMARY OF THE INVENTION

Accordingly, the present invention provides a bipolar plate for use in a fuel cell stack. The bipolar plate includes a first plate having a first coolant face with a first set of coolant channels formed therein. A second plate has a second coolant face with a second set of coolant channels formed therein. The first and second coolant faces are adjacent to one another to intermittently cross-link the first and second sets of coolant channels over a region of the first and second coolant faces.

In one feature, the first set of cooling channels define a first wave pattern having a first amplitude and a first wavelength. The second set of cooling channels define a second wave pattern having a second amplitude and a second wavelength. The first wave pattern of the first set of coolant channels is interwoven with respect to the second wave pattern of the second set of cooling channels.

In another feature, a first set of lands of the first coolant face intermittently contact a second set of lands of the second coolant face to define intermittent interface areas. The first plate and the second plate are bonded at the intermittent interface areas.

In still another feature, the first plate includes a first flow field formed in a face opposite the first coolant face.

In yet another feature, the second plate includes a second flow field formed in a face opposite the second coolant face.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
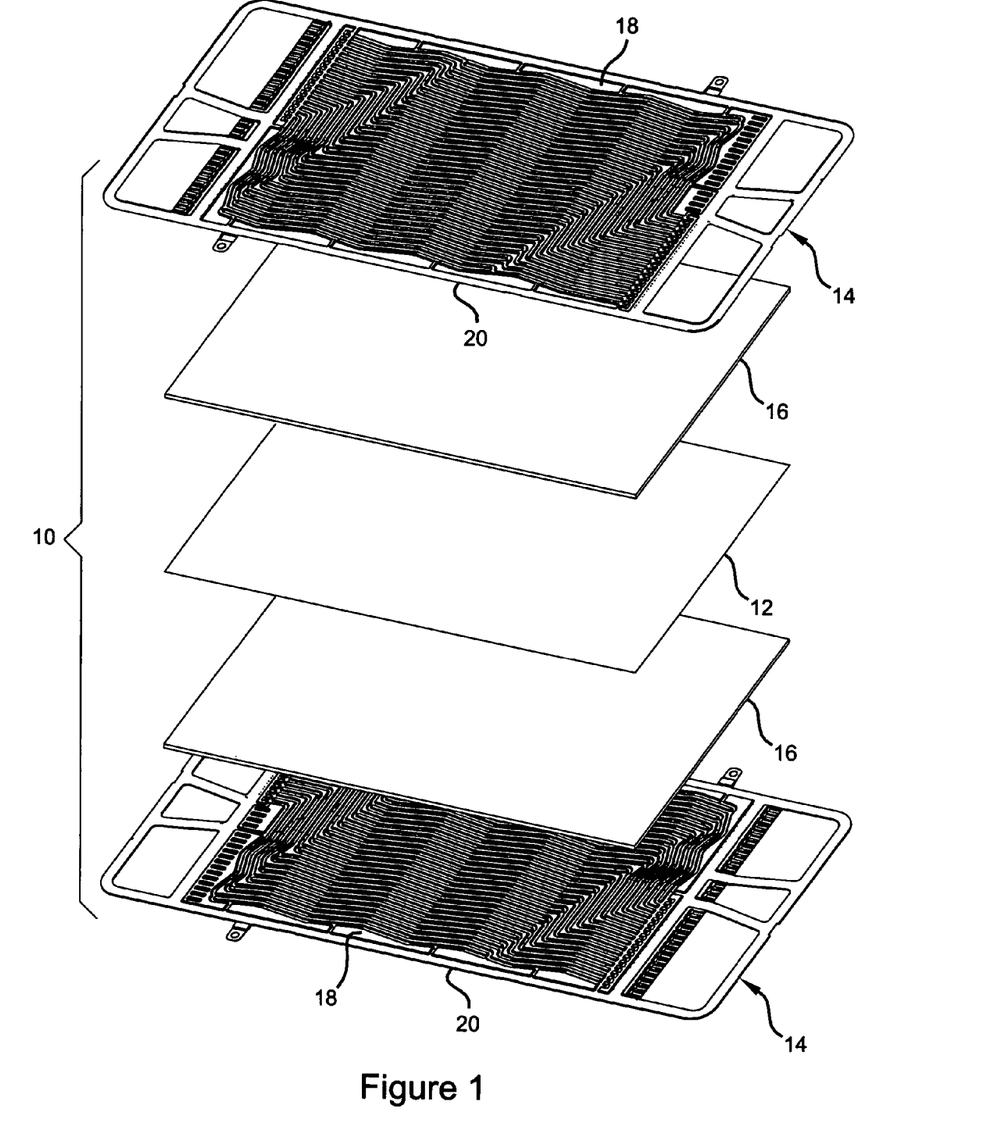
FIG. 1 is an exploded view of a fuel cell stack including bipolar plates according to the present invention.

Referring now to FIG. 1, a portion of a fuel cell stack is illustrated. The fuel cell stack includes a fuel cell 10 having a polymer electrolyte membrane (PEM) 12 sandwiched between bipolar plates 14. Diffusion media 16 are included and are disposed between the PEM 12 and the bipolar plates 14. The bipolar plates 14 each include a cathode side 18 and an anode side 20. An anode reactant flows across the anode side 20 and is diffused through the diffusion media 16 for reaction across the PEM 12. A cathode reactant flows across the cathode side 18 and is diffused through the diffusion media 16 for reaction across the PEM 12. A gasket (not shown) is disposed between the bipolar plates 14 and the PEM 12 to seal the fluid flow across the cathode side 18 and anode side 20.

Figure 2:
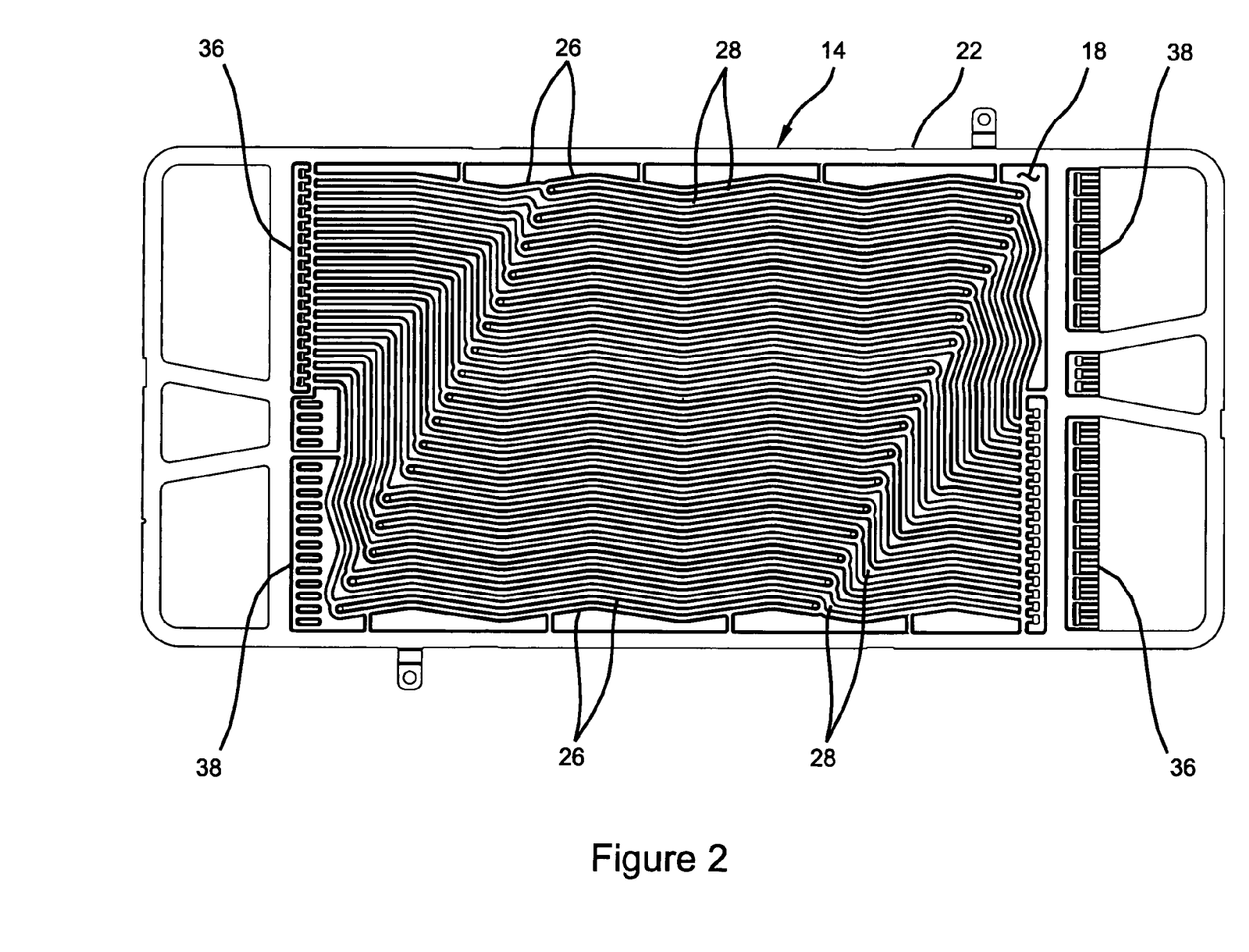
FIG. 2 is a plan view of a reactant gas side of a cathode plate of the bipolar plate.
Figure 3:
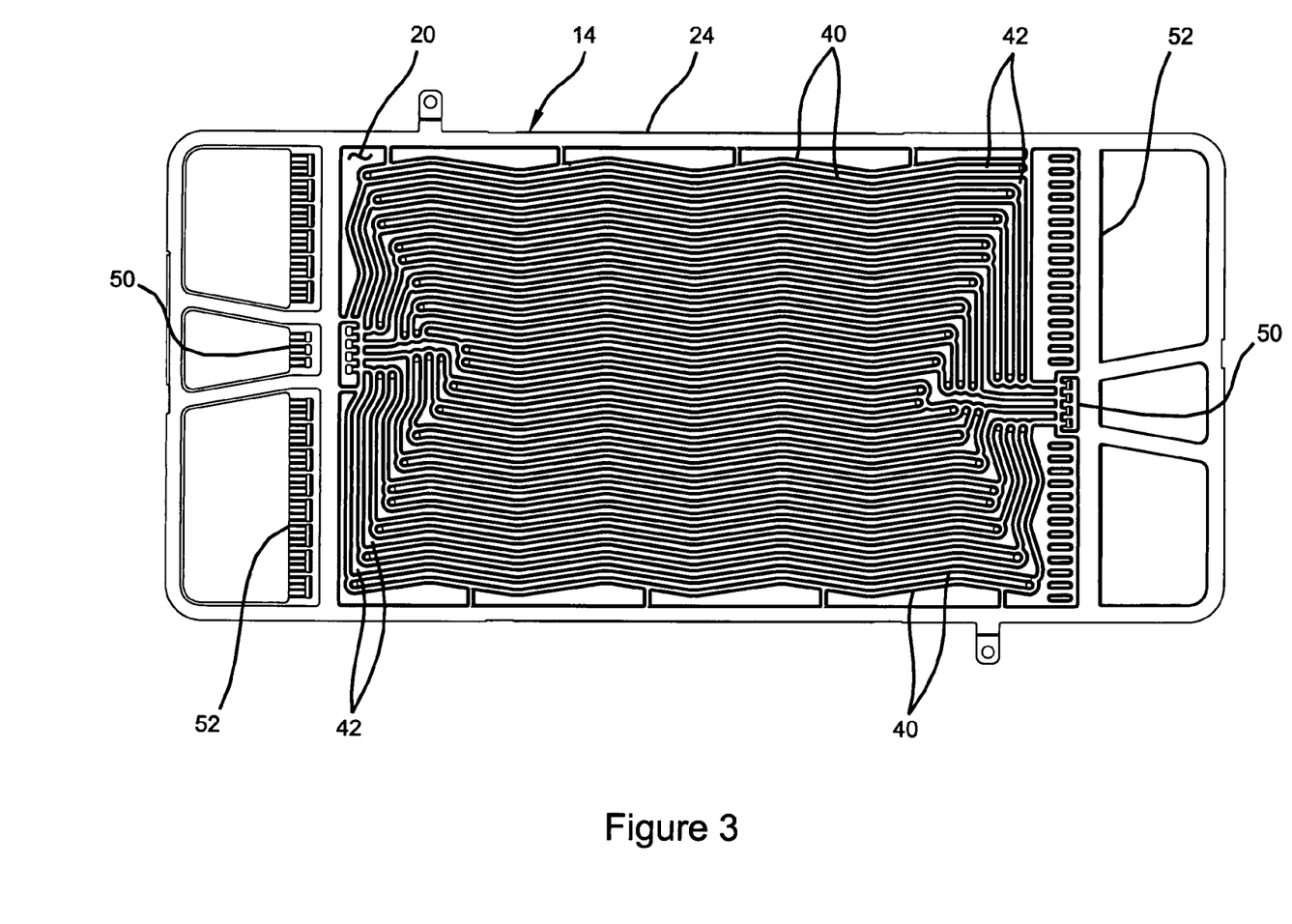
FIG. 3 is a plan view of a reactant gas side of an anode plate of the bipolar plate.
Figure 4:
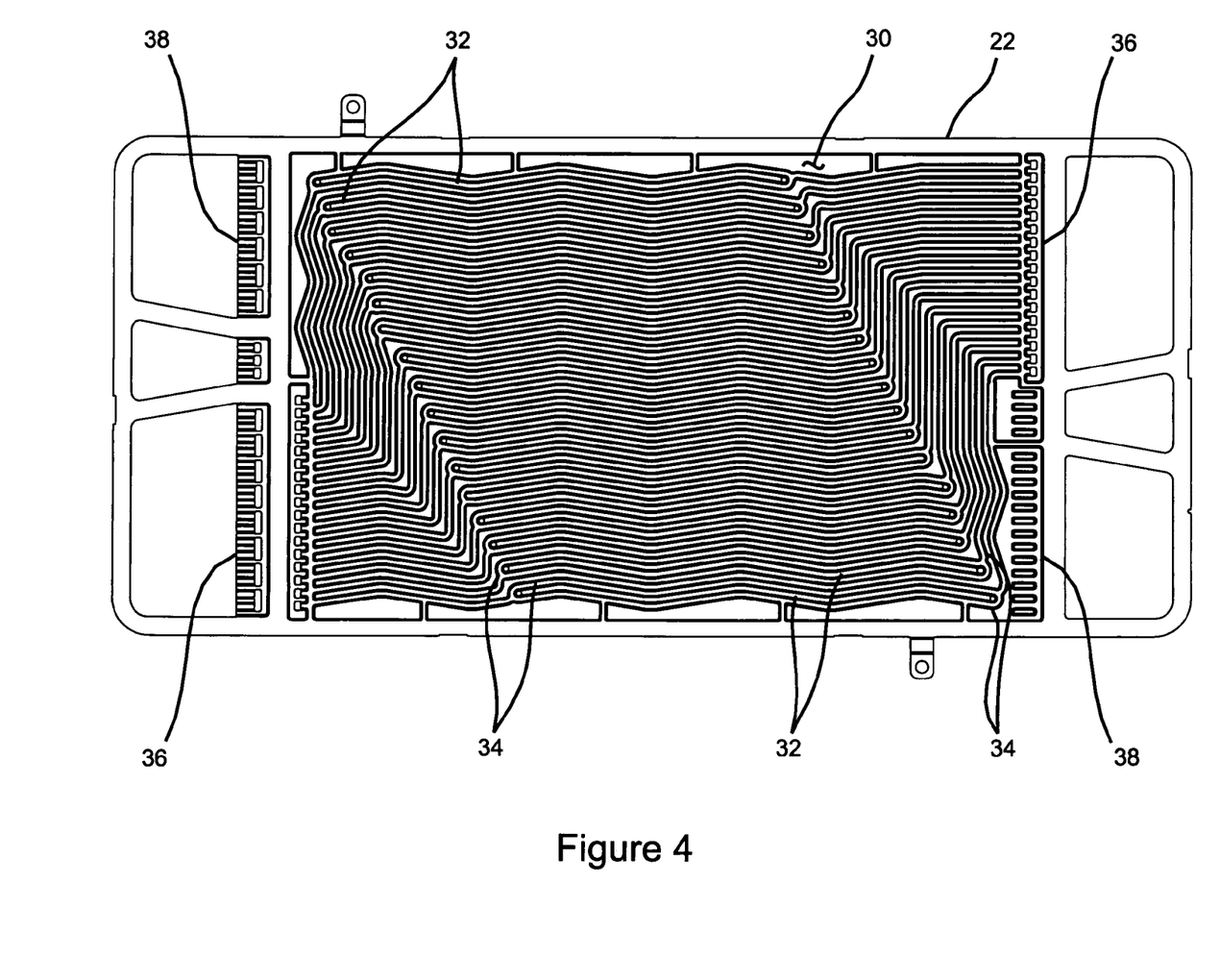
FIG. 4 is a plan view of a coolant side of the cathode plate of the bipolar plate.

Referring now to FIGS. 2 through 7, the bipolar plate 14 will be discussed in detail. The bipolar plate 14 includes a cathode plate 22 and an anode plate 24. With particular reference to FIGS. 2 and 4, the cathode plate 22 includes the cathode side 18 having a cathode flow field defined by zigzagging cathode flow channels 26. The cathode flow channels are separated by zigzagging lands 28. The cathode plate 22 also includes a coolant side 30 having a coolant flow field defined by zigzagging coolant flow channels 32. The coolant flow channels are similarly separated by zigzagging lands 34. The cathode plate 22 includes cathode inlet and outlet headers 36 formed on either side. The cathode inlet and outlet headers 36 direct cathode reactant flow into the cathode flow channels 26. The cathode plate 22 further includes coolant inlet and outlet headers 38. The coolant inlet and outlet headers 38 direct coolant flow into the coolant flow channels 32.

Figure 5:
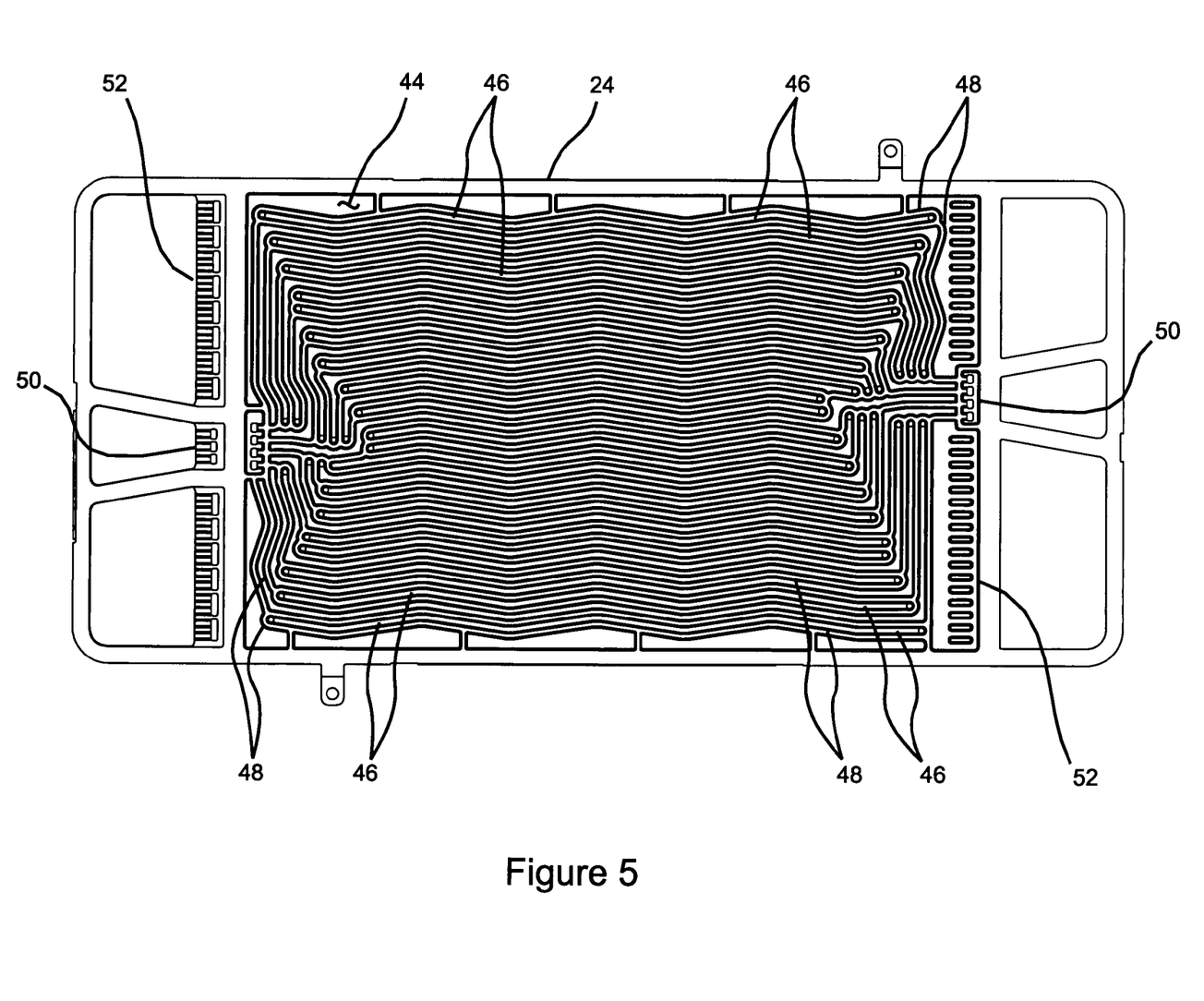
FIG. 5 is a plan view of a coolant side of the anode plate of the bipolar plate.

With particular reference to FIGS. 3 and 5, the anode plate 24 includes the anode side 20 having an anode flow field defined by zigzagging anode flow channels 40. The anode flow channels 40 are separated by zigzagging lands 42. The anode plate 24 also includes a coolant side 44 having a coolant flow field defined by zigzagging coolant flow channels 46. The coolant flow channels 46 are similarly separated by zigzagging lands 48. The anode plate 24 includes anode inlet and outlet headers 50 formed on either side. The anode inlet and outlet headers 50 direct anode reactant flow into the anode flow channels 40. The anode plate 24 further includes coolant inlet and outlet headers 52. The coolant inlet and outlet headers 52 direct coolant flow into the coolant flow channels 46.

As illustrated, the cathode and anode plates 22,24 are stamped stainless steel plates such that the reactant gas channels 26,40 define the coolant lands 34,48 and the reactant gas lands 28,42 define the coolant channels 32,46. The cathode and anode plates 22,24 are stacked adjacently and are bonded together to form the bipolar plate 14. Bonding of the cathode and anode plates 22,24 can be achieved in a number of manners including, but not limited to, adhesive bonding, brazing, soldering and welding. The cathode and anode plates 22,24 are stacked such that the coolant sides 30,44 are immediately adjacent to and facing one another. Although the cathode and anode plates 22,24 are traditionally provided as stamped stainless steel plates, it is anticipated that the flow field designs described herein can be applied to various methods and materials for producing the cathode and anode plates 22,24. Therefore, the present invention is not limited to stainless steel sheet forming.

Figure 6:
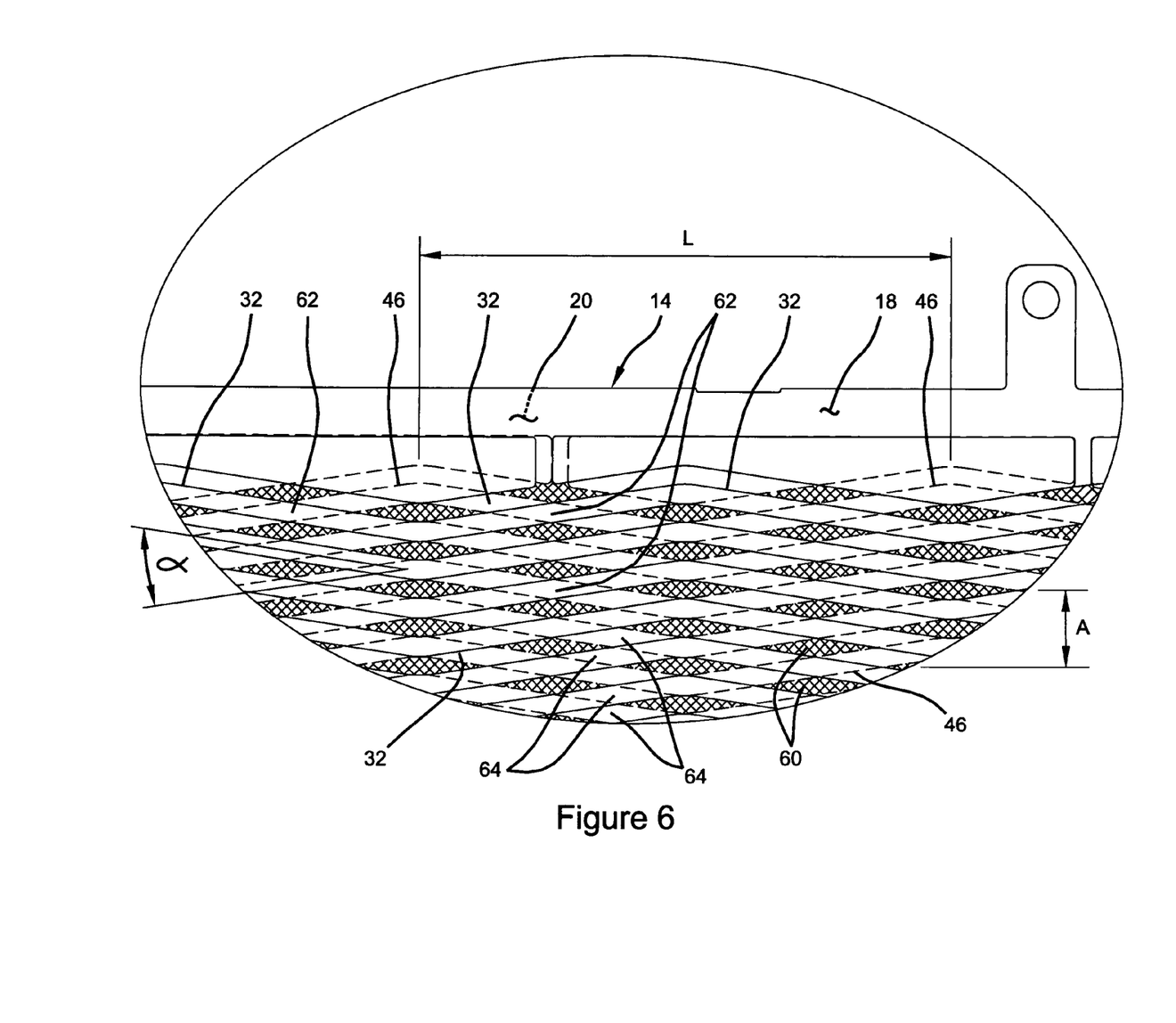
FIG. 6 is a schematic illustration of cross-linked cooling channels of the anode plate and cathode plate.
Figure 7:
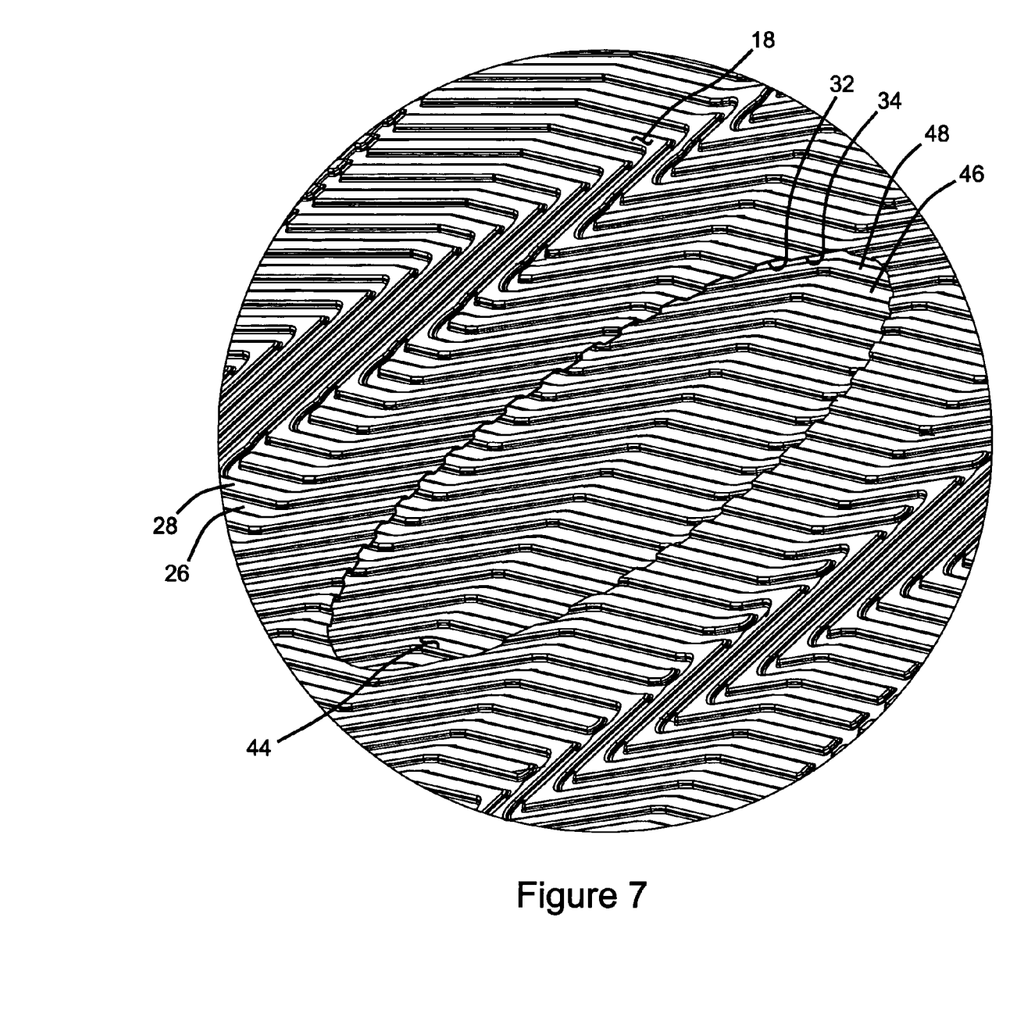
FIG. 7 is a perspective view of a portion of the bipolar plate having a circular section cut from the center of the cathode plate

With particular reference to FIGS. 6 and 7, the coolant sides 30,44 of the cathode and anode plates 22,24, respectively, are aligned such that the coolant channels 32,46 are interweaved across one another. FIG. 7 illustrates a portion of the bipolar plate 14 having a circular section cut from the cathode plate 22. The coolant channels 32 of the cathode plate 22 are shown with a solid line and the coolant channels 46 of the anode plate 24 are shown in phantom (see FIG. 6).

Interweaving results in the coolant channels 32,46 cutting across one another at a resultant angle $\alpha$. The resultant angle $\alpha$ can vary based on the wave length (L) or amplitude (A) of the zigzagging coolant channels 32,46. Interweaving is provided by zigs in the coolant channels 32 of the cathode plate 22 crossing zags in the coolant channels 46 of the anode plate 24 and vice-versa. In this manner, the lands 34 between the coolant channels 32 of the cathode plate 22 are intermittently adjacent to the lands 48 between the coolant channels 46 of the anode plate 24 in an interface area 60, indicated as hatched areas. The cathode and anode plates 22,24 are bonded together at the intermittent interface areas 60. The interface areas 60 define conductivity points across the cathode and anode plates 22,24 to carry electrical current through the fuel cell stack.

As illustrated, the channels of the cathode and anode plates 22,24 have the same geometric configuration (i.e., wavelength, amplitude and resultant angle). However, the present invention contemplates using different geometric configurations for the channels of the cathode and anode plates 22,24. It is further anticipated that the wavelength and/or amplitude for the channels can vary across the cathode and anode plates 22,24. That is to say, a particular channel or group of channels may have a first amplitude and wavelength in one region of the cathode and/or anode plates 22,24 and have a second amplitude and/or a second wavelength in another region. As a result, the resultant angle $\alpha$ will also vary from region to region.

Because the coolant channels 32,46 of the cathode and anode plates 22,24 are interweaved there are intermittent cross-link areas 62 where the coolant channels 32 are open to the coolant channels 46. In the intermittent cross-link areas 62, fluid flow is enabled between the coolant channels 32,46 of the cathode and anode plates 22,24. Also, as a result of interweaving, there are intermittent non-cross-link areas 64, where the coolant channels 32 of the cathode plate 22 are open to the lands 48 of the anode plate 24 and the coolant channels 46 of the anode plate 24 are open to the lands 34 of the cathode plate 22. In the intermittent non-cross-link areas 64, fluid flow is limited to the respective coolant channels 32,46 and no cross-linking occurs. Thus, a three-dimensional or multi-layer coolant flow field is defined and includes two elevations. The first elevation is defined by the coolant channels 32 of the cathode plate 22 and the second elevation is defined by the coolant channels 46 of the anode plate 24. Generally, two-dimensional or planar flow exists in the non-cross-link areas 64 at one of the two elevations. Coolant flow in the third dimension exists in the cross-link area 62 where coolant may flow between the first and second elevations. The three-dimensional multi-layer flow field enables gaseous, aqueous or two-phase temperature regulation of the fuel cell stack.

The bipolar plates 14 are positioned on either side of the PEM 12 such that adjacent reactant flow fields are mostly aligned. That is to say, the bipolar plates 14 are positioned such that the zigzagging cathode flow channels 26 of the cathode side 18 are mostly aligned with the zigzagging anode flow channels 40 of the anode side 20. Thus, there is no or limited interweaving between the cathode flow channels 26 and anode flow channels 40 across the PEM 12. This is achieved by rotating every other bipolar plate 14 180° in the plane of the plate surface relative to the bipolar plate 14 on the other side of the PEM 12.

Humidification of outlet reactant streams to inlet reactant streams is improved when inlet and outlet headers 36,50 are oriented such that the reactant fluids flow in a counter-flow manner. As used herein, the term counter-flow indicates the anode fluid flowing across the PEM 12 in a direction opposite to the cathode fluid flow. It is also anticipated that the reactant fluid flow can be provided in a co-flow manner. As used herein, the term co-flow indicates the anode fluid flowing across the PEM 12 in the same direction as the cathode fluid flow. The fuel cell stack can be arranged either as co-flow or counter-flow depending on which headers 36,50 are chosen as inlets and outlets.

Similarly, the coolant flow can be directed in one of either a counter-flow manner, co-flow manner or a cross-flow manner, relative to the reactant fluid flows. As used herein, cross-flow indicates coolant fluid flowing in a direction transverse to the direction of the reactant fluid flow. Cross-flow can include a transverse direction anywhere between greater than 0° (i.e., parallel) up to 90° (i.e., perpendicular) relative to the reactant fluid flow direction. In order to achieve a cross-flow coolant fluid direction with either the co-flow or counter-flow reactant fluid direction, the amplitude (i.e., interweaving) of the coolant channels 32,46 is increased, thereby effectively increasing the resultant angle $\alpha$. Increasing the amplitude of the coolant channels 32,46 increases the number of cross-link areas 62 across a greater number of coolant channels 32,46.

Interweaving of the channels of the cathode and anode plates 22,24 results in a uniform stiffness in the compression sensitive areas of the bipolar plate 14. The adjacent channels are oriented such that each land acts as a brace for multiple adjacent channels. The wavelength and amplitude of the channels can be modified to optimize plate stiffness in a given area. Adjacent alignment of the reactant flow fields across the PEM 12 improves distribution of compressive loads across the fuel cell stack. More particularly, the force that the bipolar plate 14 imparts on the PEM 12 via the flow channel lands are optimized to ensure that the lands have a more uniform response or deflection when load is applied. This uniformity improves vibration performance and reduces the local stress on the PEM 12 and other components of the fuel cell stack. In this manner, durability of the fuel cell stack is increased. Additionally, the current density through the contact points can also be reduced to provide reduced contact resistance losses.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bipolar plate for use in a fuel cell stack, comprising:
   a first plate having a first coolant face with a first set of coolant channels and a first set of lands arranged in a first zigzag pattern to provide a first planar flow field at a first elevation, said first zigzag pattern having a first zig leg and a first zag leg wherein said first zig leg and said first zag leg are non-parallely orientated; and
   a second plate having a second coolant face with a second set of coolant channels and a second set of lands arranged in a second zigzag pattern to provide a second planar flow field at a second elevation diverse from said first elevation, said second zigzag pattern having a second zig leg and a second zag leg wherein said second zig leg and said second zag leg are non-parallely orientated, said second coolant face confronting said first coolant face such that said first and second coolant channels cross one another at an acute resultant angle to define an intermittent interface areas formed adjacent said first and second sets of coolant channels and intermittent cross-linked area providing fluid communication between said first and second planar flow fields.

2. The bipolar plate of claim 1 wherein said first zigzag pattern defines a first wave pattern having a first amplitude and a first wavelength.

3. The bipolar plate of claim 2 wherein said second zigzag pattern defines a second wave pattern having a second amplitude and a second wavelength.

4. The bipolar plate of claim 3 wherein said first wave pattern of said first set of coolant channels is interwoven with respect to said second wave pattern of said second set of cooling channels.

5. The bipolar plate of claim 1 wherein said first plate and said second plate are bonded at said intermittent interface areas.

6. The bipolar plate of claim 1 wherein said first plate includes a first flow field formed in a face opposite said first coolant face.

7. The bipolar plate of claim 1 wherein said second plate includes a second flow field formed in a face opposite said second coolant face.

8. A fuel cell stack, comprising:
   a polymer electrolyte membrane (PEM); and
   a first bipolar plate disposed on a first side of said PEM and a second bipolar plate disposed on a second side of said PEM, wherein at least one of said first and second bipolar plates includes:
   a cathode plate having a first coolant face with a first set of coolant channels and a first set of lands arranged in a first zigzag pattern to provide a first planar flow field at a first elevation, said first zigzag pattern having a first zig leg and a first zag leg wherein said first zig leg and said first zag leg are non-parallely orientated; and
   an anode plate having a second coolant face with a second set of coolant channels and a second set of lands arranged in a second zigzag pattern to provide a second planar flow field at a second elevation diverse from said first elevation, said second zigzag pattern having a second zig leg and a second zag leg wherein said second zig leg and said second zag leg are non-parallely orientated, said second coolant face confronting said first coolant face such that said first and second coolant channels cross one another at an acute resultant angle to define intermittent interface areas formed adjacent said first and second coolant channels and an intermittent cross-linked area providing fluid communication between said first and second planar flow fields.

9. The fuel cell stack of claim 8 wherein said first zigzag pattern defines a first wave pattern having a first amplitude and a first wavelength.

10. The fuel cell stack of claim 9 wherein said second zigzag pattern defines a second wave pattern having a second amplitude and a second wavelength.

11. The fuel cell stack of claim 10 wherein said first wave pattern is interwoven with respect to said second wave pattern.

12. The fuel cell stack of claim 8 wherein said anode plate and cathode plate are bonded at said intermittent interface areas.

13. The fuel cell stack of claim 8 further comprising:
    a set of anode channels formed in said anode plate in fluid communication with said PEM; and
    a set of cathode channels formed in said cathode plate in fluid communication with said PEM.

14. The fuel cell stack of claim 13 wherein said set of anode channels and said set of cathode channels each define a wave pattern.

15. The fuel cell stack of claim 14 further comprising:
    a first diffusion medium interposed between said first bipolar plate and said PEM; and
    a second diffusion medium interposed between said second bipolar plate and said PEM.

16. A bipolar plate for a fuel cell stack, of the type having a first face and a second face, comprising a three-dimensional coolant flow field interposed between said first and second faces, said three-dimensional flow field including a first set of coolant channels and a first set of lands arranged in a first zigzag pattern at a first elevation to provide a first planar flow field, said first zigzag pattern having a first zig leg and a first zag leg wherein said first zig leg and said first zag leg are non-parallely orientated, a second set of coolant channels and a second set of lands arranged in a second zigzag pattern at a second elevation to provide a second planar flow field, said second zigzag pattern having a second zig leg and a second zag leg wherein said second zig leg and said second zag leg are non-parallely orientated, said first coolant channels crossing said second channels at and acute resultant angle, intermittent interface areas formed adjacent said first and second sets of coolant channels, and intermittent cross-linked areas to provide fluid communication between said first and second through plane flow fields in a cross-plane direction.

17. The bipolar plate of claim 16 wherein said first set of coolant channels comprises a first wave pattern having a first amplitude and a first wavelength in a plane substantially parallel to said first face.

18. The bipolar plate of claim 17 wherein said second set of coolant channels comprises a second wave pattern having a second amplitude and a second wavelength in a plane substantially parallel to said second face.

19. The bipolar plate of claim 18 wherein said first wave pattern of said first set of coolant channels is interwoven with respect to said second wave pattern of said second set of cooling channels.

20. The bipolar plate of claim 16 further comprising:

a first plate including said first face; and a second plate including said second face, wherein said first plate and said second plate are bonded at said intermittent interface areas.

21. The bipolar plate of claim 16 further comprising:

a first reactant flow field formed in said first face; and a second reactant flow field formed in said second face.

* * * * *